US008105162B2

United States Patent
Uchibori et al.

(10) Patent No.: US 8,105,162 B2
(45) Date of Patent: Jan. 31, 2012

(54) VIDEO GAME PROCESSING APPARATUS, METHOD AND COMPUTER PROGRAM PRODUCT FOR CONTROLLING PROGRESS OF A VIDEO GAME

(75) Inventors: Kengo Uchibori, Tokyo (JP); Yasunari Hiroyama, Chiba (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 54 days.

(21) Appl. No.: 12/546,928

(22) Filed: Aug. 25, 2009

(65) Prior Publication Data

US 2010/0062850 A1 Mar. 11, 2010

(30) Foreign Application Priority Data

Sep. 11, 2008 (JP) ................................. 2008-233877

(51) Int. Cl.
*A63F 9/24* (2006.01)
(52) U.S. Cl. .......................................... 463/31; 463/42
(58) Field of Classification Search .................... 463/42, 463/31
See application file for complete search history.

(56) References Cited

U.S. PATENT DOCUMENTS

| 5,884,029 | A * | 3/1999 | Brush et al. .................... 709/202 |
| 6,009,458 | A * | 12/1999 | Hawkins et al. ............... 709/203 |
| 2005/0143174 | A1* | 6/2005 | Goldman et al. ............... 463/42 |
| 2005/0182693 | A1 | 8/2005 | Alivandi |
| 2007/0013692 | A1* | 1/2007 | Jung et al. ..................... 345/419 |
| 2007/0265047 | A1 | 11/2007 | Nomura |
| 2008/0102949 | A1 | 5/2008 | Hasegawa et al. |
| 2008/0102950 | A1 | 5/2008 | Ishii et al. |
| 2008/0119268 | A1 | 5/2008 | Kando et al. |
| 2008/0139310 | A1 | 6/2008 | Kando et al. |

FOREIGN PATENT DOCUMENTS

| JP | 8-087489 | 4/1996 |
| JP | 2002-200352 | 7/2002 |
| JP | 2003-010552 | 1/2003 |
| JP | 2003-126555 | 5/2003 |
| JP | 2003-256755 | 9/2003 |
| JP | 2006-141702 | 6/2006 |
| JP | 2007-528240 | 10/2007 |
| WO | 2005/079341 | 9/2005 |

OTHER PUBLICATIONS

"RPG Playing Manual, Field map operating manual," RPG Maker '98, ASCII Inc., pp. 32-33, Apr. 30, 1998.
English language Abstract of JP 2003-256755, Sep. 12, 2003.

* cited by examiner

*Primary Examiner* — Omkar Deodhar
(74) *Attorney, Agent, or Firm* — Greenblum & Bernstein, P.L.C.

(57) ABSTRACT

A video game processing apparatus for controlling progress of a video game is provided. The video game is used to simulate resale business of goods on a display screen of an image display apparatus. The image display apparatus is caused to distinguishably display dealer characters and buyer characters on the display screen of the image display apparatus. Arbitrary goods for the purpose of buying are associated with each of the buyer characters. A buying process of goods from the selected dealer character is executed when a player selects any from the dealer characters. A resale process of goods to the selected buyer character is executed when the player selects any from the buyer characters.

10 Claims, 16 Drawing Sheets

FIG. 6

CHARACTER APPEARANCE MANAGING TABLE

|  | STAGE 1 | STAGE 2 | STAGE 3 | STAGE 4 | .... |
|---|---|---|---|---|---|
| 0 TO 40 SEC. | 4 | 5 | 10 | 10 | .... |
| 40 TO 80 SEC. | 6 | 8 | 10 | 12 | .... |
| 80 TO 120 SEC. | 8 | 10 | 10 | 15 | .... |
| 120 TO 160 SEC. | — | 15 | 10 | 15 | .... |
| 160 TO 200 SEC. | — | 10 | 10 | 20 | .... |
| 200 TO 240 SEC. | — | — | — | 15 | .... |
| 240 TO 280 SEC. | — | — | — | 15 | .... |
| 280 TO 320 SEC. | — | — | — | 10 | .... |
| 320 TO 360 SEC. | — | — | — | 10 | .... |
| .... | .... | .... | .... | .... | .... |

FIG. 7

GOODS APPEARANCE MANAGING TABLE

|  | STAGE 1 | STAGE 2 | STAGE 3 | STAGE 4 | .... |
|---|---|---|---|---|---|
| CD | 50 | 30 | 20 | 20 | .... |
| COSMETIC | 20 | 30 | 20 | 10 | .... |
| CLOTH | 20 | 20 | 20 | 10 | .... |
| ALCOHOL | 10 | 10 | 20 | 20 | .... |
| SUNDRIES | — | 5 | 20 | 10 | .... |
| FURNITURE | — | 5 | — | 15 | .... |
| JEWELRY | — | — | — | 5 | .... |
| HOME ELECTRONICS | — | — | — | 5 | .... |
| VEHICLE | — | — | — | 5 | .... |
| .... | .... | .... | .... | .... | .... |

FIG. 8

STOCK GOODS MANAGING TABLE

|  | GOODS NAME | PRICE | STATE |
|---|---|---|---|
| STOCK 1 | CD | 15 | TRADABLE |
| STOCK 2 | COSMETIC | 20 | TRADABLE |
| STOCK 3 | COSMETIC | 35 | DURING REPAIR |
| STOCK 4 | CLOTHING | 60 | TRADABLE |
| STOCK 5 | VACANCY | — | — |
| STOCK 6 | VACANCY | — | — |
| STOCK 7 | VACANCY | — | — |
| STOCK 8 | VACANCY | — | — |
| ⋮ | ⋮ | ⋮ | ⋮ |

FIG. 10

REPAIR PROCESS MANAGING TABLE

|  | STATE | OPERATION TARGET | OPERATION REMAINING TIME |
|---|---|---|---|
| REGION 1 | IN OPERATION | STOCK 1 | 3.0 |
| REGION 2 | IN OPERATION | STOCK 2 | 1.2 |
| REGION 3 | IN OPERATION | STOCK 2 | 1.2 |
| REGION 4 | RECEIVABLE | — | 0.0 |
| REGION 5 | VACANCY | — | — |
| REGION 6 | VACANCY | — | — |

PRICE DETERMINING TABLE

|  | SELLING PRICE (= COST PRICE) | BUYING PRICE (= RESALE PRICE) | PRICE AFTER REPAIR |
|---|---|---|---|
| CD | 7 | 10 | 12 |
| COSMETIC | 12 | 15 | 18 |
| CLOTH | 15 | 20 | 25 |
| ALCOHOL | 20 | 25 | 35 |
| SUNDRIES | 35 | 45 | 60 |
| FURNITURE | 200 | 220 | 250 |
| JEWELRY | 3000 | 3200 | 3500 |
| HOME ELECTRONICS | 250 | 300 | 500 |
| VEHICLE | 5000 | 5500 | 6000 |
| .... | .... | .... | .... |

FIG. 16

OBSTACLE CHARACTER APPEARANCE MANAGING TABLE

|  | STAGE 1 | STAGE 2 | STAGE 3 | STAGE 4 | .... |
|---|---|---|---|---|---|
| 0 TO 100 SEC. | 1 | 1 | 2 | 3 | .... |
| 100 TO 200 SEC. | 1 | 2 | 3 | 4 | .... |
| 200 TO 300 SEC. | — | — | — | 4 | .... |
| 300 TO 400 SEC. | — | — | — | 3 | .... |
| .... | .... | .... | .... | .... | .... | ated herein by reference in its entirety.

VIDEO GAME PROCESSING APPARATUS, METHOD AND COMPUTER PROGRAM PRODUCT FOR CONTROLLING PROGRESS OF A VIDEO GAME

CROSS-REFERENCE TO RELATED APPLICATION

The present application relates to subject matter contained in Japanese Patent Application No. 2008-233877, filed on Sep. 11, 2008, the disclosure of which is expressly incorporated herein by reference in its entirety.

BACKGROUND OF THE INVENTION

1. Field of the Invention

The present invention relates to technique to control progress of a video game for simulating resale business of goods on a display screen of an image display apparatus.

2. Description of the Related Art

Heretofore, various games whose theme is "selling and buying of goods" have been provided as a simulation game (generic name of a game in which a specific situation is reproduced). In such a resale simulation game, a condition to clear the game is generally that a player makes a profit by taking many factors into consideration.

For example, Japanese Patent Application Publication No. 2003-256755 discloses a simulation system for carrying out a stocks selling and buying simulation game for virtual investment in stocks in conjunction with a change in financial conditions of a company.

In a conventional simulation game system as described above, there has been a problem that a range of target users becomes narrow because a player is required to have expert knowledge such as know-how of management and to carry out complicated operations based on the knowledge.

SUMMARY OF THE INVENTION

The present invention has been made in view of existence of the problem described above, and it is an object of the present invention to provide a goods reselling simulation game that is caused to proceed by means of direct and simple operations of even a user having no or little expert knowledge, and to provide a simulation game acceptable for a wide range of users.

In order to achieve the above object, one aspect of the present invention is directed to a video game processing apparatus for controlling progress of a video game. The video game is used to simulate resale business of goods on a display screen of an image display apparatus. The video game processing apparatus according to the present invention includes a character display controller for causing the image display apparatus to distinguishably display dealer characters and buyer characters on the display screen of the image display apparatus.

The video game processing apparatus also includes a goods buying processor for, when a player selects any from the dealer characters, executing a buying process of goods from the selected dealer character.

The video game processing apparatus also includes a goods resale processor for, when the player selects any from the buyer characters, executing a resale process of goods to the selected buyer character.

Since the video game processing apparatus is constructed as described above, it is possible to provide a goods reselling simulation game that is caused to proceed by means of direct and simple operations of even a user having no or little expert knowledge, and to provide a simulation game acceptable for a wide range of users.

In the video game processing apparatus according to the present invention, it is preferable that the video game processing apparatus further includes: a stock goods memory for storing the goods bought from the selected dealer character as stock goods; and a stock goods display controller for causing the image display apparatus to display the stock goods stored in the stock goods memory in a stock goods display region on the display screen, wherein the goods buying processor executes a process to store the goods associated with the dealer character selected by the player in the stock goods memory as the stock goods, and wherein, in the case where the buyer character selected by the player matches with the stock goods rightly, the goods resale processor executes a process to delete the resold goods from the stock goods stored in the stock goods memory.

In the video game processing apparatus according to the present invention, it is preferable that the video game processing apparatus further includes a goods buying request receiver for receiving selection of a dealer character by means of operations of the player as a request to buy goods from the dealer character, wherein the goods buying processor executes the buying process of the goods from the selected dealer character, and wherein, in the case where the number of stock goods stored in the stock goods memory reaches a predetermined upper limit even when any of the dealer characters is selected by means of operations of the player, the goods buying request receiver rejects the request to buy the goods by selection of the dealer character.

In the video game processing apparatus according to the present invention, it is preferable that arbitrary goods for the purpose of buying are associated with each of the buyer characters, and that, in the case where stock goods selected from the goods displayed in the stock goods display region by means of operations of the player coincides with goods associated with the buyer character selected by the player after selection of arbitrary stock goods, it is determined that right matching is carried out.

In the video game processing apparatus according to the present invention, it is preferable that the video game processing apparatus further includes: a point applier for applying a point to the player, giving and receiving of an amount of money associated with goods as a target of buying and reselling occurring in the buying process and the resale process, the point applier applying a higher point to the player as a difference generated by the resale becomes larger; a repair target goods receiver for receiving goods selected by the player from the goods displayed in the stock goods display region as repair target goods; and a repair processor for executing a repair process to update a goods point indicated by goods data of the repair target goods received by the repair target goods receiver to a value after repair.

In the video game processing apparatus according to the present invention, it is preferable that goods intended for sale of plural kinds of goods are associated with each of the dealer characters and goods intended for buying of plural kinds of goods are associated with each of the buyer characters, and that the character display controller causes the image display apparatus to display a goods icon indicating goods intended for sale by a dealer character in the vicinity of the dealer character, and to display a goods icon indicating goods intended for buying by a buyer character in the vicinity of the buyer character.

In the video game processing apparatus according to the present invention, it is preferable that the character display controller includes: a character appearance controller for causing each of the dealer characters and buyer characters to appear on the display screen in accordance with a predetermined appearance rule; and a character leaving controller that measures staying time of each of the dealer characters and buyer characters, the character leaving controller causing each of the dealer characters and buyer characters to leave from the display screen when predetermined stayable time elapses, and wherein the image display apparatus is caused to display remaining time of the predetermined stayable time in the vicinity of each of the buyer characters and dealer characters on the display screen.

In the video game processing apparatus according to the present invention, it is preferable that the character appearance controller adjusts appearance of each of the buyer characters and dealer characters so that matching required when the goods resale processor executes the resale process becomes more difficult as a level of the player is increased.

Further, another aspect of the present invention is directed to a method of controlling progress of a video game that is used to simulate resale business of goods on a display screen of an image display apparatus. The method according to the present invention includes causing the image display apparatus to distinguishably display dealer characters and buyer characters on a display screen of the image display apparatus.

The method also includes, when a player selects any from the dealer characters, executing a buying process of goods from the selected dealer character.

The method also includes, when the player selects any from the buyer characters, executing a resale process of goods to the selected buyer character.

Moreover, still another aspect of the present invention is directed to a computer program product for controlling progress of a video game that is used to simulate resale business of goods on a display screen of an image display apparatus. The computer program product according to the present invention causes a computer to execute steps including causing the image display apparatus to distinguishably display dealer characters and buyer characters on a display screen of the image display apparatus.

The steps also include, when a player selects any from the dealer characters, executing a buying process of goods from the selected dealer character.

The steps also include, when the player selects any from the buyer characters, executing a resale process of goods to the selected buyer character.

According to the present invention, it is possible to provide a goods reselling simulation game that is caused to proceed by means of direct and simple operations of even a user having no or little expert knowledge, and to provide a simulation game acceptable for a wide range of users.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 6 is an explanatory drawing showing an example of a storage state of character appearance information;

FIG. 7 is an explanatory drawing showing an example of goods appearance information;

FIG. 8 is an explanatory drawing showing an example of stock goods information;

FIG. 10 is an explanatory drawing showing an example of information on repair icon;

FIG. 16 is an explanatory drawing showing an example of appearance information of obstacle characters.

DETAILED DESCRIPTION OF THE INVENTION

Hereinafter, one embodiment of the present invention will be described with reference to the appending drawings.

Figure 1:
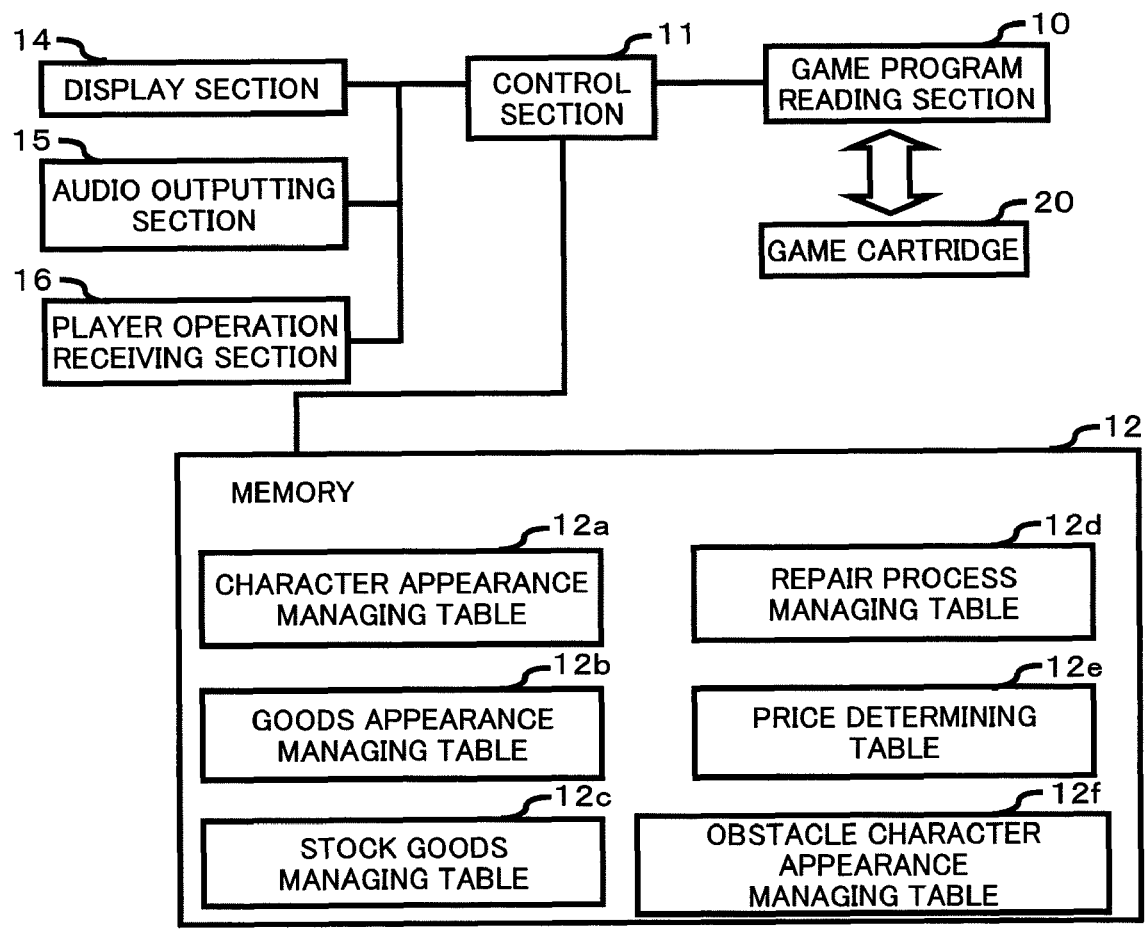
FIG. 1 is a block diagram showing a configuration example of a video game processing apparatus according to one embodiment of the present invention.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a memory 12; a display section 14; an audio outputting section 15; and a player operation receiving section 16.

The game program reading section 10 removably receives a game cartridge 20 in which a storage medium is embedded. A game program is stored in the storage medium. The game program reading section 10 reads out a necessary game program from the storage medium of the inserted game cartridge 20. In this regard, in this embodiment, a video game program classified into a simulation game, whose theme is selling and buying of goods, is stored in the storage medium embedded in the game cartridge 20.

The control section 11 has a function to execute a game program read by the game program reading section 10, and to execute various kinds of control for causing the video game to proceed in accordance with operations of a player.

The memory 12 is a storage medium for storing game programs and various data required to cause the video game to proceed. The memory 12 is configured by a nonvolatile memory such as a RAM, for example. Various kinds of information registered and updated in accordance with progress of the game and various kinds of information used in the game read out from the storage medium embedded in the game cartridge 20 are stored in the memory 12.

In the present embodiment, a character appearance managing table 12a, a goods appearance managing table 12b, a stock goods managing table 12c, a repair process managing table 12d, a price determining table 12e and an obstacle character appearance managing table 12*f* are stored in the memory 12. Each of the tables 12*a* to 12*f* will be described later in detail.

The display section 14 is a display apparatus for displaying progress of a game and a game screen according to operations of the player in accordance with control of the control section 11. The display section 14 is configured by a liquid crystal display, for example.

The audio outputting section 15 outputs audio according to progress of the game and operations of the player in accordance with control of the control section 11. The player operation receiving section 16 receives operational signals according to operations of the player from a controller constructed from a plurality of buttons and a mouse, and informs the control section 11 of its result.

In the video game processing apparatus 100 of the present embodiment, a system to read out a game program from the game cartridge 20 is adopted. However, the video game processing apparatus 100 may be configured so as to download a game program in a wireless or wired manner from a game server for delivering games, for example.

Figure 2:
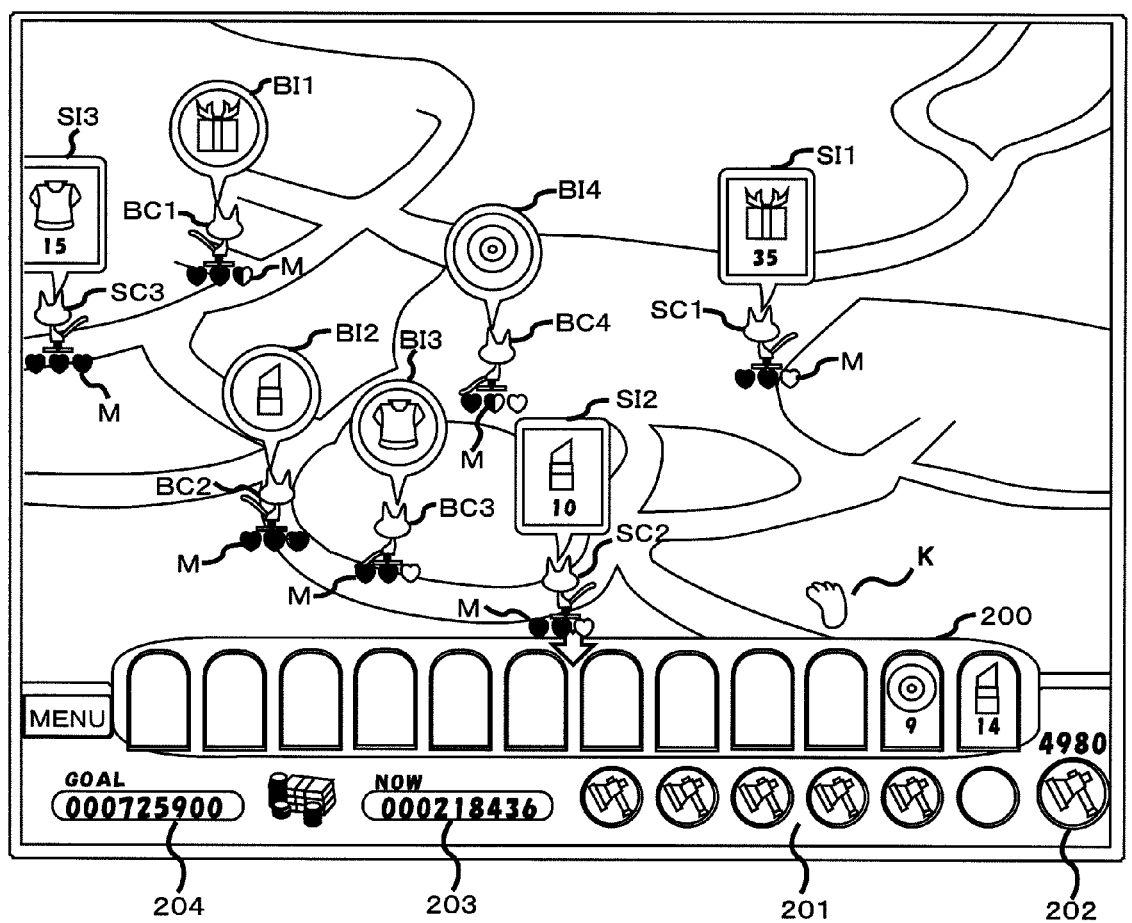
FIG. 2 is an explanatory drawing showing an example of a display screen.

Here, a summary of a video game executed by the video game processing apparatus 100 of the present embodiment will be described. FIG. 2 is an explanatory drawing showing an example of the game screen for explaining a summary of the video game of the present embodiment. In the present embodiment, as shown in FIG. 2, goods selling characters (dealer characters) SC1 to SC3 intended to sell goods and goods buying characters (buyer characters) BC1 to BC4 intended to buy goods are distinguishably displayed on the game screen (on a game field) by differentiating those display colors from each other, for example. Further, as shown in FIG. 2, a cursor K moving on the game screen by means of operations of the player (for example, mouse operations) is displayed.

Each of the goods selling characters SC1 to SC3 and goods buying characters BC1 to BC4 arbitrarily moves on the game field. Selling goods icons SI1 to SI3 indicating goods and those selling amounts of money (selling points) that corresponding characters set to sale targets are respectively displayed in the vicinity of each of the goods selling characters SC1 to SC3. Further, buying goods icons BI1 to BI4 indicating goods that corresponding characters set to buying targets are respectively displayed in the vicinity of each of the goods buying characters BC1 to BC4.

A stay remaining time gauge M is displayed in the vicinity of each of the goods selling characters SC1 to SC3 and goods buying characters BC1 to BC4. The stay remaining time gauge M is used to inform the player of remaining time when the corresponding character stays on the game screen. In the present embodiment, each of the goods selling characters SC1 to SC3 and goods buying characters BC1 to BC4 is controlled so as to be displayed on the game screen by a predetermined time after appearance on the game screen and to leave from the game screen when the time elapses.

Further, as shown in FIG. 2, a stock goods display region 200 for displaying goods bought from some of the goods selling characters SC1 to SC3 as the stock goods is provided in the game screen. A repair icon display region 201 for displaying repair icons each used when stock goods are repaired; an increasing instruction icon display region 202 for displaying a repair icon increasing instruction icon; an overall point display region 203 for displaying a current overall point; and a clear point display region 204 indicating a point required for clear of a stage are further provided in the game screen. A purchase price of the repair icon is displayed in the vicinity of the increasing instruction icon display region 202.

Figure 3:
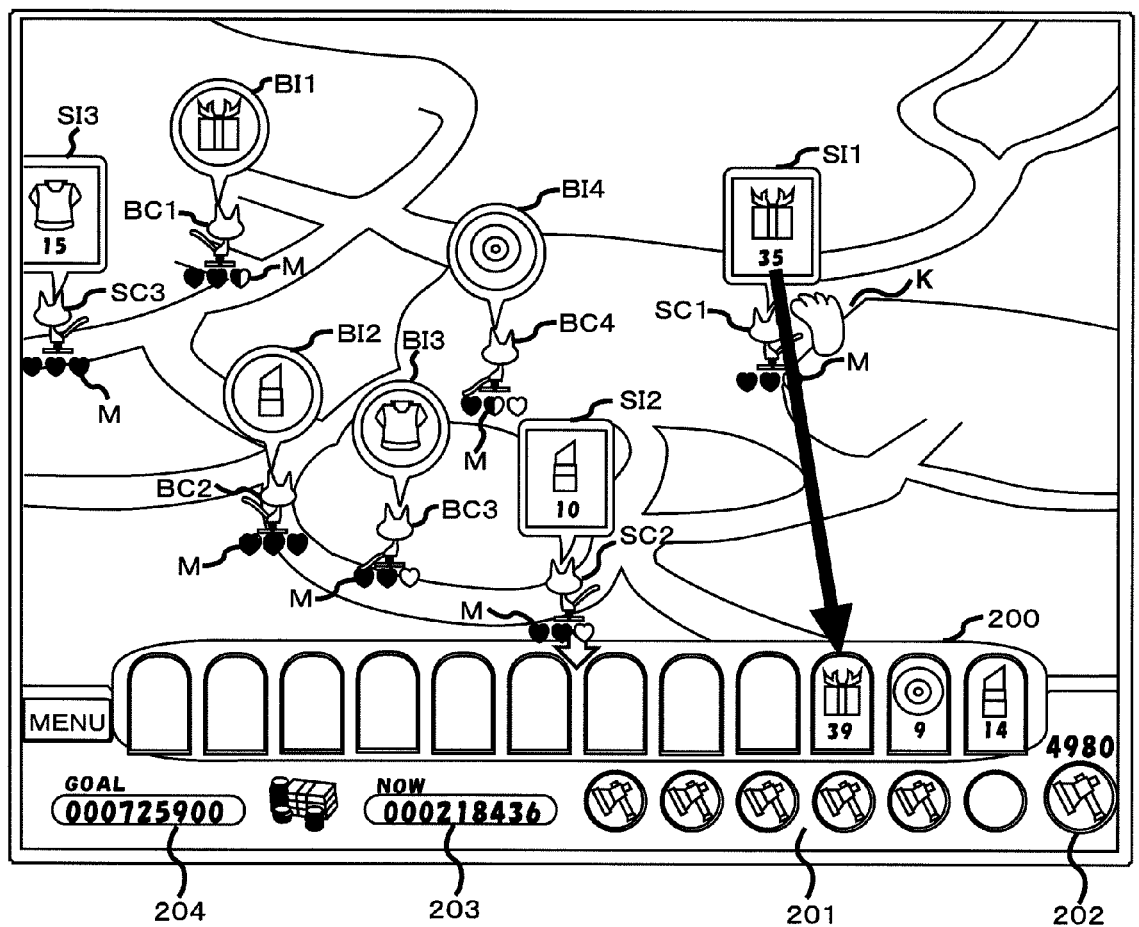
FIG. 3 is an explanatory drawing showing another example of the display screen.

In the video game of the present embodiment, when the player selects any of the goods selling characters SC1 to SC3, buying of corresponding goods is met, and the bought goods are kept as the stock goods. More specifically, when the player selects the goods selling character SC1 by operating the cursor K, for example, as shown in FIG. 3, the goods that the goods selling character SC1 sets to a sale target become stock goods, and the goods indicated by the selling goods icon SI1 are displayed in the stock goods display region 200. In this regard, the goods selling character SC1 is deleted from the game screen together with the selling goods icon SI1 after sale of the goods is completed.

Figure 4:
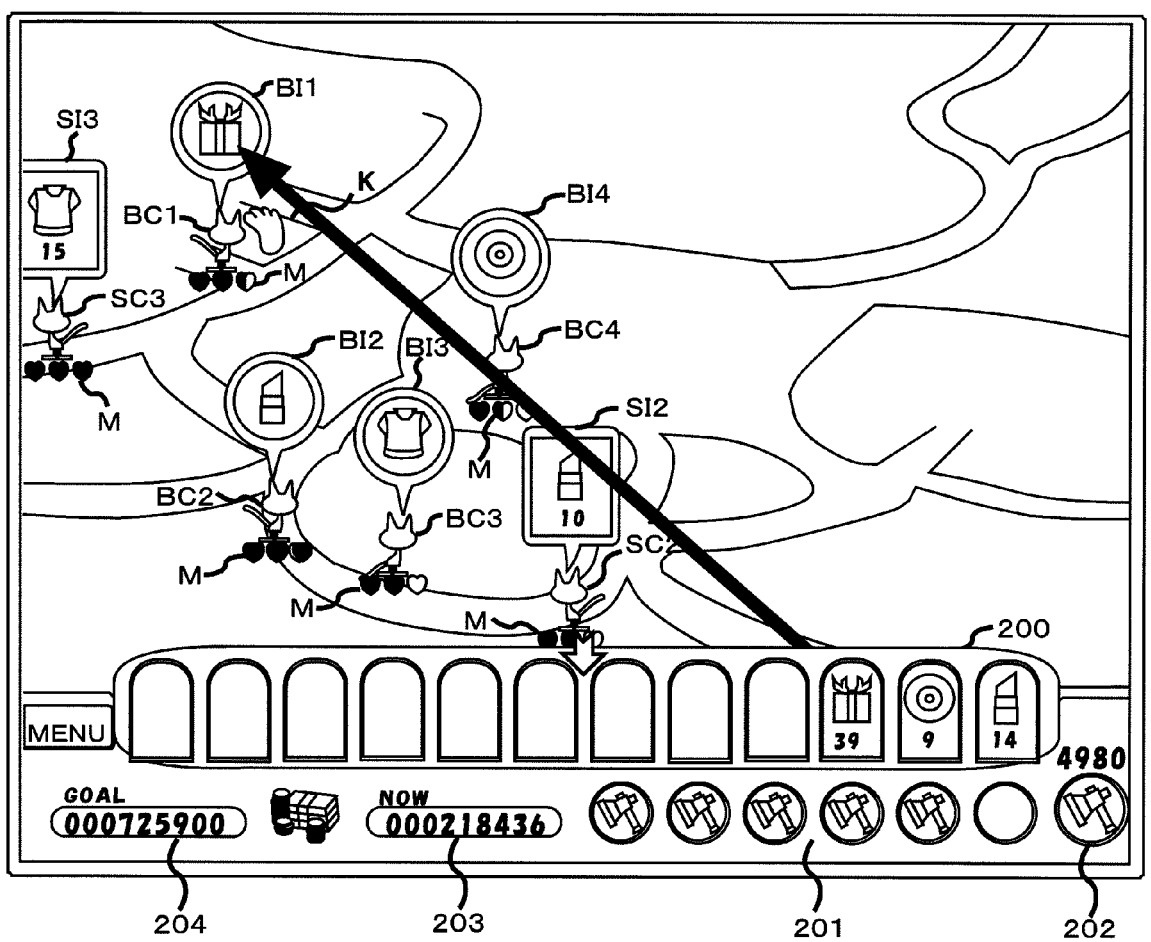
FIG. 4 is an explanatory drawing showing still another example of the display screen.

Then, when the player selects any of the stock goods and any of the goods buying characters BC1 to BC4, resale of the stock goods is met. More specifically, for example, as shown in FIG. 4, when the player selects the goods displayed in the stock goods display region 200 by operating the cursor K, and further selects the goods buying character BC1 whose goods are set to a buying target, resale of the selected goods to the goods buying character BC1 is met. In this regard, when the resale is met, the resold goods are deleted from the stock goods display region 200, and the goods buying character BC1 that buys the goods is deleted from the game screen together with the buying goods icon BI1.

In the present embodiment, the game proceeds as described above. In such a game, the player increases points by obtaining a resale profit. In this regard, in the video game of the present embodiment, the stock goods displayed in the stock goods display region 200 are repaired by selecting the repair icon, and this makes it possible to resell the stock goods after their commodity values (selling price) are heightened.

Next, an operation of the video game processing apparatus 100 of the present embodiment will be described.

Figure 5:
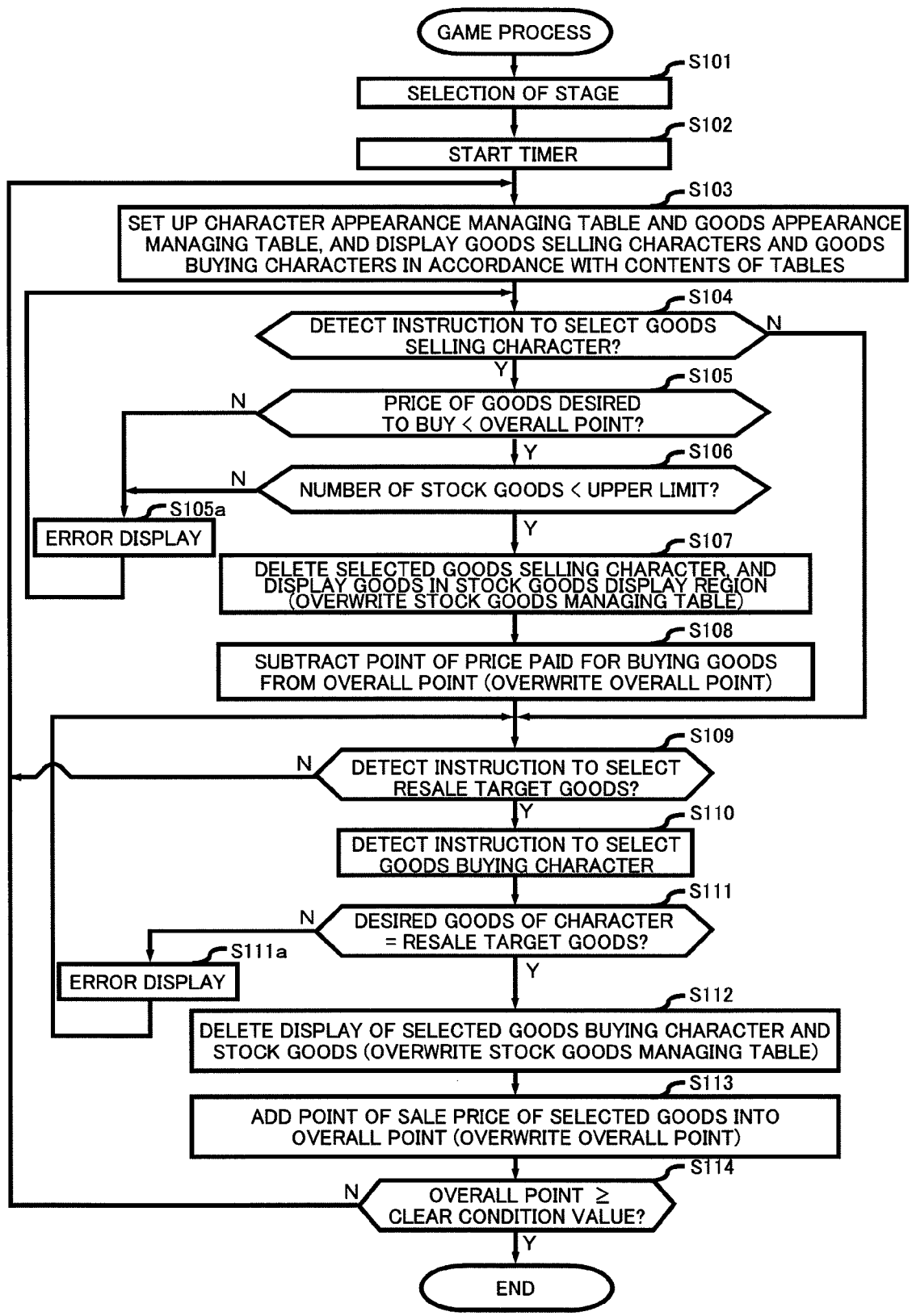
FIG. 5 is a flowchart showing an example of a game process.

FIG. 5 is a flowchart showing an example of a game process executed by the video game processing apparatus 100. In the game process, a user A operating the video game processing apparatus 100 gets goods from any of goods selling characters on the display screen by operating the cursor K, and a process to resell the got goods to any of goods buying characters is then carried out. In this regard, the contents of processes that are not related to the present invention may be omitted.

When a game is started in the game process, the control section 11 first receives selection of a stage by means of operations of the player via the player operation receiving section 16 (Step S101). A time limit and a clear condition are set for each "stage". In this regard, as for selection of a stage, it may be configured so that the player can select any stage arbitrarily, or a stage may be determined arbitrarily by the game program. Further, in the case of determining a stage by the game program, for example, the game program may execute stages from a stage whose difficulty level is the lowest in turn.

When determination of the stage is received, the control section 11 starts the game at the received stage to start a timer (Step S102). In this regard, this timer is one for measuring a time limit of each stage. When it reaches the time limit, the control section 11 executes a process for time over in priority over any process, and terminates the game forcibly.

Next, the control section 11 refers to the character appearance managing table 12*a* and the goods appearance managing table 12*b* stored in the memory 12 in accordance with an instruction to select the stage thus informed; determines the number of characters to be displayed on the display screen of the display section 14 and goods that each character intends to buy or sell; and executes a process to display characters of the determined number, each of which sets the determined goods to a buying or sale target on the game screen displayed in the display section 14 (Step S103).

FIG. 6 is an explanatory drawing showing an example of a storage state of character appearance information in the character appearance managing table 12*a*. As shown in FIG. 6, the character appearance information is information in which an elapsed time range from start time of the game at the corresponding stage is associated with appearance number specifying information capable of specifying the appearance number of characters at the time range in each stage. In the present embodiment, the elapsed time range is set so that elapsed time from start of the game becomes every 40 seconds. According to the present embodiment, the appearance number specifying information is not set after 120 seconds in Stage 1. This is because a time limit of Stage 1 is set to a predetermined period of time (for example, 120 seconds or 130 seconds) after 120 seconds. Here, a value indicated by the "appearance number specifying information" represents "the number of pairs" of a goods selling character and a goods buying character within defined time after start of the game in each stage. Namely, in the present embodiment, four pairs of a goods selling character and a goods buying character are determined as appearance characters until 40 seconds after start of the game in Stage 1.

By managing goods selling characters and goods buying characters as pairs in this manner, the same number of goods selling characters and goods buying characters appear on the display screen. Thus, progress of the game becomes easy. In this regard, in order to increase a difficulty level of the game, the control section 11 may select the predefined number of characters in a random manner without regard to "pair".

In this case, in the present embodiment, a goods selling character is paired with a goods buying character with respect to the same goods intended to be sold or bought so that the game proceeds smoothly. By adopting such a design, corresponding buying and selling partners exist for all goods displayed on the display screen. This makes it possible to prevent a situation in which buying and selling are not met at all even though the player operates the game so well.

However, in the case where a goods selling character is always paired with a goods buying character with respect to all goods and the goods selling character and the corresponding goods buying character are displayed on the display screen at the same time, a difficulty level of the game decreases too much, and as a result, there is a possibility to lower interest of the player in the game. In the present embodiment, in order to prevent such a situation, the game is set up so that time when the goods selling character is actually displayed after a pair of characters to be displayed is determined is shifted from the time when the goods buying character is actually displayed.

More specifically, when a character to be displayed is determined, the control section 11 applies a random number of 1 to 10 to each pair of a goods selling character and a goods buying character. This number indicates an interval until each character is displayed on the display screen of the display section 14 after the control section 11 refers to the character appearance managing table 12*a*. Namely, in the case where random numbers "3" and "7" are respectively applied to the goods selling characters and the goods buying characters when appearance numbers of characters are determined, for example, the control section 11 causes the display section 14 to display the goods selling character on the display screen at 3 seconds later, and to display the goods buying character on the display screen at 7 seconds later. By adopting such a design, it is possible to avoid a situation that a pair of a goods selling character and a goods buying character with respect to the same goods is always displayed and the respective characters are displayed on the display screen at the same time to some extent.

In this regard, the control section 11 may apply a random number to only a goods buying character, by which the goods selling character is displayed on the display screen ahead of the corresponding goods buying character or the goods selling character and the goods buying character are displayed at least at the same time. By displaying the characters at such timing, the player can cause the game to proceed without any trouble in such a manner that the player first buys goods from any of goods selling characters and next resells the bought goods to the corresponding goods buying character. Therefore, by setting up the game in this manner in a stage whose difficulty level is low, even a less skilled player may enjoy the game sufficiently.

Further, by widening a width of values of the random number in a stage whose difficulty level is higher, a goods buying character is sometimes displayed ahead of the corresponding goods selling character, and a goods buying character corresponding to stock goods may hardly be displayed. For this reason, it becomes difficult for the game to proceed by merely repeating just simple operations so that the player is required to think hard about stock management. Further, the player is required to pay attention to existence remaining time of characters on the display screen and management of stock goods. For this reason, it is possible to maintain interest of a skilled player who gets used to the game.

FIG. 7 is an explanatory drawing showing an example of a storage state of goods appearance information in the goods appearance managing table 12*b*. As shown in FIG. 7, in the goods appearance information, a name of goods that may become a buying or sale target and an appearance ratio (%) of the respective goods are set for every stage. In the present embodiment, in the case where Stage 1 is selected, the control section 11 refers to the character appearance managing table 12*a*, and causes four pairs of characters to appear on the display screen from start of the game until 40 seconds. At the time, the control section 11 determines goods to be assigned to each pair of characters by referring to the goods appearance managing table 12*b*. In the case of the present embodiment, since an appearance ratio of goods "CD (Compact Disc)" is the highest of "50 (%)" in Stage 1, goods "CD" are assigned to two pairs of characters corresponding to 50% of the characters that appear on the display screen. However, the control section 11 determines goods assigned to the characters by referring to the goods appearance managing table 12*b* for one pair of characters. Thus, it is not necessarily the case where goods "CD" are assigned to two pairs.

Next, the control section 11 receives an instruction to select a goods selling character by means of operations of the controller by the player via the player operation receiving section 16 (Step S104). When the instruction to select a goods selling character is detected ("YES" at Step S104), the control section 11 confirms whether a value indicating a price of goods (goods that the player wants to buy) that the selected goods selling character sets to a sale target is less than an overall point (point displayed in the overall point display region 203; in the present embodiment, a predetermined point is applied to the player as operating money at the start of the game) that the player possesses or not (Step S105). Here, the overall point is stored in the memory 12, for example.

In the case where the value indicating the price of the goods that the selected goods selling character sets to the sale target is the overall point or more ("NO" at Step S105), the control section 11 carries out error display for informing the player that the goods cannot be bought (Step S105a), and the processing flow returns to Step S104.

On the other hand, in the case where the value indicating the price of the goods that the selected goods selling character sets to the sale target is less than the overall point ("YES" at Step S105), the control section 11 refers to the stock goods managing table 12c, and determines whether the number of stock goods reaches an upper limit or not (Step S106).

FIG. 8 is an explanatory drawing showing a storage state of stock goods information in the stock goods managing table 12c. As shown in FIG. 8, the stock goods information is information in which a stock number; a goods name of stock goods; a selling price of corresponding goods; and a state of the corresponding goods are associated with each other. In the case where there is no stock goods corresponding to a stock number, as shown in FIG. 8, "vacancy" is inserted into a column of the "goods name". In the game of the present embodiment, the player can have goods up to a quantity of the stock number (for example, 12 pieces) as stock.

In the case where a repair process (will be described later) for stock goods is not being carried out, a column of the "state" of the corresponding goods becomes "tradable", and the stock goods becomes a state where selection of goods as a resale target by the player can be received. Conversely, in the case where the repair process is being carried out, the column of the "state" becomes "during repair", and the stock goods becomes a state where selection of goods as a resale target by the player cannot be received.

Therefore, in the case where no region of "vacancy" remains in the stock goods managing table 12c, the control section 11 determines that the number of stock goods reaches the upper limit ("NO" at Step S106), and carries out error display (Step S105a). On the other hand, in the case where the number of stock goods does not reach the upper limit ("YES" at Step S106), the control section 11 causes the processing flow to proceed to Step S107.

At Step S107, the control section 11 deletes the goods selling character and a goods icon associated with this character from the display screen; adds data including a name of the goods thus bought and a resale price thereof into the stock goods managing table 12c as stock goods; and displays an icon of the goods in the stock goods display region 200.

Next, the control section 11 subtracts a point used for the buying (price of the bought goods) from the overall point; stores the result in the memory 12; and displays a value indicated by the subtraction result in the overall point display region 203 on the display screen (Step S108).

Next, the control section 11 confirms whether or not an instruction to select resale target goods by means of operations of the player via the player operation receiving section 16 (Step S109). In the case where the instruction to select the resale target goods is detected ("YES" at Step S109), the control section 11 receives selection of a goods buying character by means of operations of the player via the player operation receiving section 16 (Step S110).

Subsequently, the control section 11 compares the resale target goods whose selection has been received at Step S109 with the buying target goods associated with the goods buying character whose selection has been received at Step S110, and confirms whether kinds of the goods are the same or not (that is, whether or not the goods coincide with each other) (Step S111). In the case where it is determined that the kind of goods is not the same ("NO" at Step S111), the control section 11 carries out error display for informing the player that the kinds of goods are different from each other (Step S111a), and pauses the resale process here. The processing flow then returns to Step S109.

In the case where it is determined that the kinds of the goods are the same ("YES" at Step S111), the control section 11 deletes the goods buying character that is a resale target and the goods icon associated with this from the display screen; deletes data of the resold goods from the stock goods managing table 12c; and deletes the icon of the goods from the stock goods display region 200 (Step S112).

Next, the control section 11 adds a point obtained by the resale into the overall point; updates data on the overall point stored in the memory 12; and displays the overall point after addition in the overall point display region 203 on the display screen (Step S113).

The control section 11 then determines whether the overall point updated at Step S113 is a value equal to or more than a clear condition value of the stage or not (Step S114). In the case where it is determined that the overall point is less than the clear condition value ("NO" at Step S114), the processing flow returns to Step S103. In the case where it is determined that the overall point is the clear condition value or more ("YES" at Step S114), the control section 11 determines clear of the stage; causes the display section 14 to display the result on the display screen; and terminates the game process here.

Figure 9:
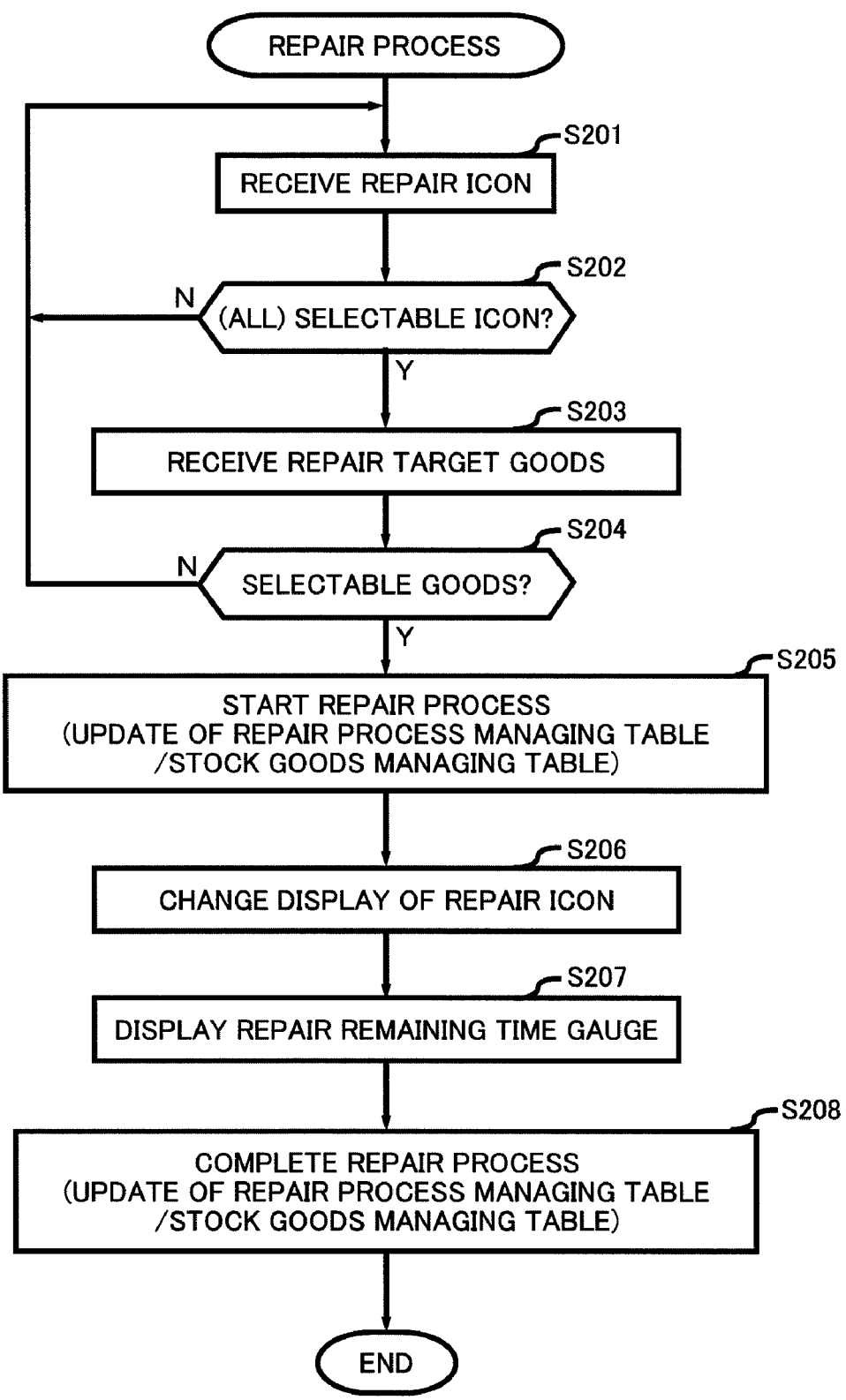
FIG. 9 is a flowchart showing an example of a repair process.

FIG. 9 is a flowchart showing an example of a repair process executed by the video game processing apparatus 100.

In the repair process, the control section 11 first receives selection of a repair icon by means of operations of the controller by the player (for example, clicking of a mouse) (Step S201).

Next, the control section 11 confirms whether the repair icon received at Step S201 is selectable one or not by referring to the repair process managing table 12d (Step S202). Here, FIG. 10 is an explanatory drawing showing an example of storage states of repair process information in the repair process managing table 12d. As shown in FIG. 10, the repair process information includes information on a region number of repair icons that can increase up to the maximum number; a state of each of the repair icons; an operation target indicating goods for which a repair process is in operation, specified by a stock number of the stock goods that is a target of the repair process; and operation remaining time of the repair process. The states of the repair icon according to the present embodiment include "in operation", "receivable", and "vacancy". In the case where the repair icon is set up and the repair process is executed, "in operation" is set up as a state of the repair icon. In the case where the repair icon is set up and the repair process is not executed, "receivable" is set up as a state of the repair icon and it becomes possible to receive selection of the corresponding repair icon and to execute a repair process. In the case where an icon is not set up, "vacancy" is set up as a state of the repair icon.

In this regard, by specifying a plurality of repair icons with respect to the same stock goods to execute a repair process, the game may be configured so that it is possible to shorten time of the repair process. FIG. 10 shows a state where repair icons assigned to Region 2 and Region 3 for the same goods (here, goods managed by Stock 2) are in operation at the same time in the repair process managing table 12d.

In the case where a state of the repair icon whose selection by the player has been received is "in operation", the control section 11 determines that it is unusable, and does not execute the repair process ("NO" at Step S202). On the other hand, in the case where states of all repair icons whose selection by the player has been received are "receivable", the control section 11 determines that it is usable ("YES" at Step S202).

In the case where it is determined that the repair icon is usable, the control section 11 receives selection of stock goods on the display screen by means of operations of the player as selection of repair target goods (Step S203). The control section 11 determines whether the repair target goods whose selection has been received are selectable goods or not by referring to the stock goods managing table 12*c* (Step S204). In the case where a state of the repair target goods in the stock goods managing table 12*c* is "tradable" at Step S204, the control section 11 determines that it is selectable ("YES" at Step S204), and executes a repair process at Steps S205 to S208. In the case where it is any state other than "tradable", the control section 11 determines that it is unselectable ("NO" at Step S204).

When the repair process is started, the control section 11 changes a "state" corresponding to the repair icon in the repair process managing table 12*d* from "receivable" to "in operation", and manages operation remaining time of the repair process for the repair icon (Step S205).

Further, the control section 11 changes a "state" corresponding to the goods that is a target of the repair process in the stock goods managing table 12*c* into "during repair" (Step S205). Thus, repair target goods cannot be selected as a resale target while the repair process is carried out.

Figure 11:
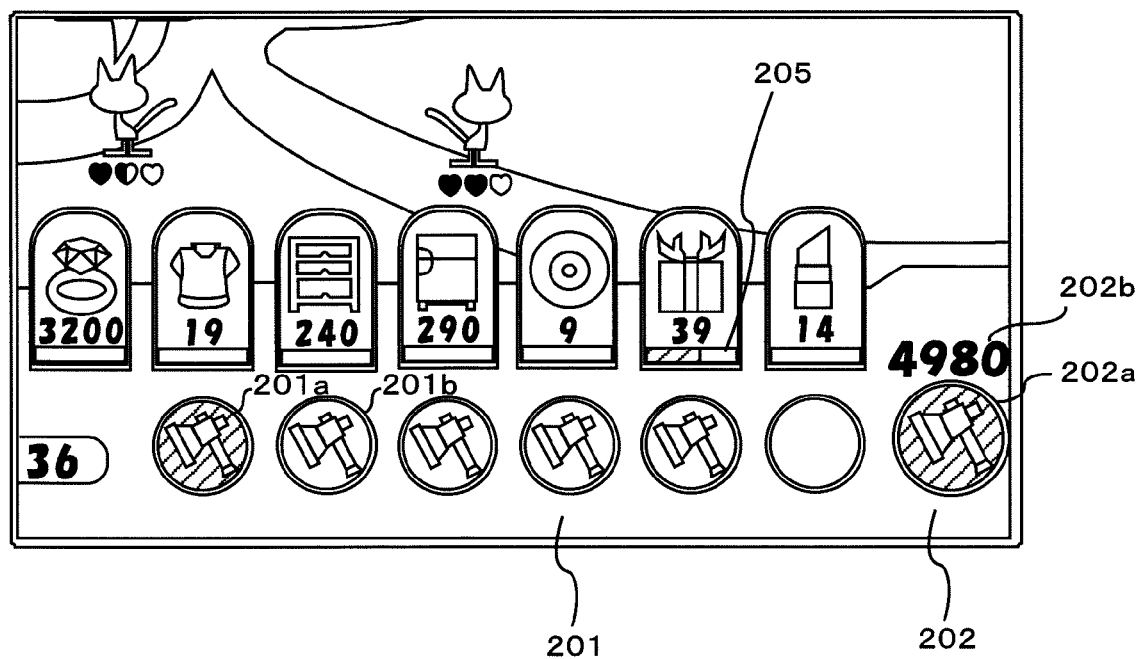
FIG. 11 is an explanatory drawing showing an example of the display screen.

Next, the control section 11, for example, changes display forms and display colors to display the repair icon that is in operation so that the repair icon, which is in operation, displayed on the display screen of the display section 14 can be differentiated from other repair icons that are not in operation. FIG. 11 is a partially enlarged view of the game screen on which the repair icon display region 201 and the increasing instruction icon display region 202 are displayed. For example, as shown in FIG. 11, a color of background may be changed and displayed so that a repair icon 201*a* that is in operation can be differentiated from repair icons 201*b* that are waiting in the repair icon display region 201, for example. In this regard, for example, as shown in FIG. 11, a repair icon increasing instruction icon 202*a* with a different size may be displayed in the increasing instruction icon display region 202 so that it can be differentiated from other icons. The "repair icon increasing instruction icon" is used to issue an instruction to newly add a repair icon into a region whose state is currently "vacancy" in the repair process managing table 12*d* in exchange for consumption of a specified point from the overall point. A purchase price 202*b* of a repair icon required when to add the repair icon newly is displayed in the vicinity of the repair icon increasing instruction icon 202*a*. Therefore, the player determines whether a repair icon is newly added or not in consideration of the repair icon purchase price 202*b* and operational statuses of a current overall point, a remaining time limit and a repair icon.

Next, the control section 11 causes the display section 14 to display a repair remaining time gauge 205 on the display screen to inform the player of a remaining time of the repair process (Step S207). In the present embodiment, as shown in FIG. 11, the repair remaining time gauge 205 is displayed in the vicinity of a stock goods icon that becomes an operation target of the repair process.

The control section 11 then changes data on the repair icon operated in the repair process managing table 12*d* from "in operation" to "receivable", and deletes data on the operation target, the operation remaining time and the like. Further, the control section 11 also changes data on the stock goods for which repair is completed in the stock goods managing table 12*c* from "during repair" to "tradable", and changes a price of the stock goods for which repair is completed by referring to the price determining table 12*e* (Step S208).

In this regard, in the case where the repair process for the same goods can be executed plural times, there is no need to raise the price by the same point whenever the repair process is executed. For example, an upper limit for the repair process may be provided, or rise in the price after repair may be decreased gradually with respect to the repair processes after twice. In this case, prices of the goods corresponding to the number of repair times are stored in the price determining table 12*e*, for example, and the control section 11 may execute a process to determine the price of the goods by referring the price determining table 12*e*.

Moreover, plural kinds of time consumed for the repair process and plural kinds of rates of increase in a goods price after repair, which are different from each other, may be prepared in the repair icon. In addition, the game may be configured so that the player must consume a point associated with each repair icon in order to get the repair icon. By constructing the game in this manner, it is possible to heighten interest in the video game. In this case, the control section 11 may cause the display section 14 to distinguishably display the respective repair icons on the display screen, and may execute a process to update data of the corresponding table in the memory 12 in accordance with performance of the repair icon.

Further, a method of displaying a goods icon displayed in the stock goods display region 200 may be changed so that one that has not been repaired yet can be readily differentiated from another that has been repaired already. In this case, in the case where the same goods can be repaired plural times, the number of repair times may also be displayed at the same time. In this case, the control section 11 changes a color of the goods icon of which the goods has already been repaired at Step S206 as described above, for example, and causes the display section 14 to display the number of repair times of the goods in the vicinity of the goods.

Figures 12, 13:
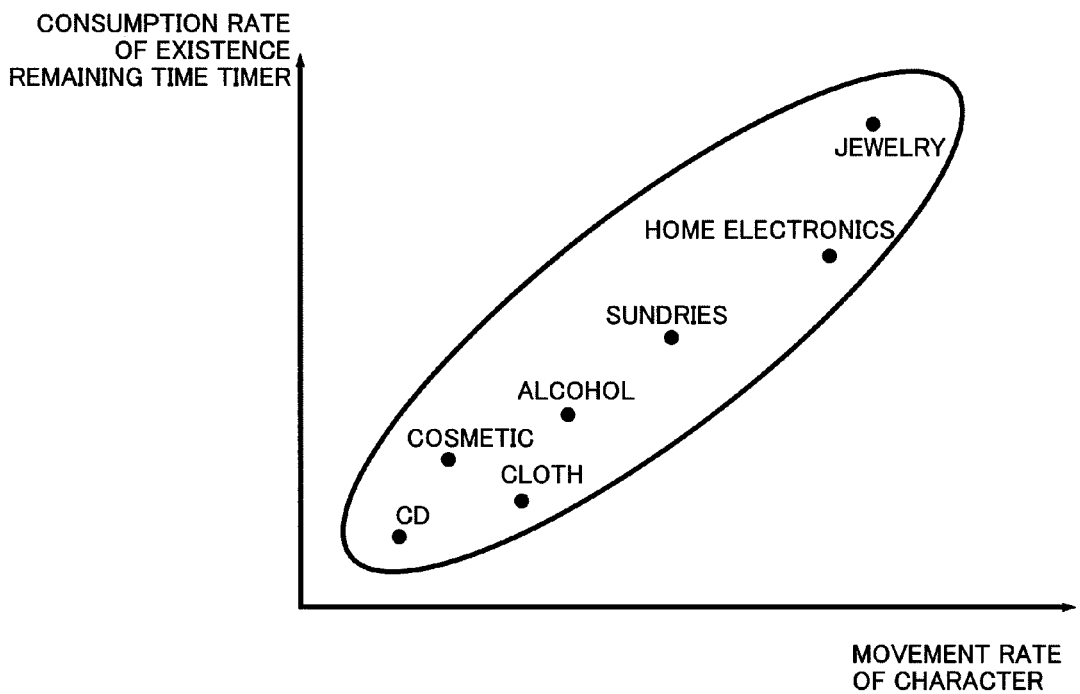
FIG. 12 is an explanatory drawing showing an example of price information of goods.
FIG. 13 is an explanatory drawing showing part of action settings for characters.

Here, a method of determining prices of various goods according to the present embodiment will be described. In the present embodiment, the control section 11 determines various prices of goods on the basis of data stored in the price determining table 12*e* included in the memory 12. FIG. 12 is an explanatory drawing showing an example of the storage state of price information of goods in the price determining table 12*e*. As shown in FIG. 12, the price information of goods includes: information on a selling price indicating a cost price for every goods name; information on a buying price indicating a resale price; and information on a price after repair. In the present embodiment, the same price is always set up for the same kind of goods.

In this regard, for example, character settings for characters associated with the respective goods have ordinality, as shown in FIG. 13. Namely, a consumption rate (consumption speed) of an existence remaining time timer for determining speed (movement rate) of a character moving on the display screen and time when the character is displayed on the display screen is defined for each kind of goods associated with the character. In the present embodiment, as shown in FIG. 13, for example, a character associated with "CD" as goods has a low movement rate (movement speed) on the display screen, whereby time to display the character is longer than that to display any character associated with other goods. Therefore, it is easy for the player to succeed in a resale action. Conversely, for example, a character associated with "jewelry" as goods has a high movement rate, whereby time to display the character on the display screen is short. Therefore, it is hard for the player to succeed in a resale action.

By setting up the game using such a property so that the more hardly the player succeeds in a resale action, the higher a resale profit becomes, it becomes possible to provide the player with a higher feeling of accomplishment.

In this regard, with respect to determination of a price, price settings when goods are repaired plural times may be added into the price determining table 12e, or the game may be configured so as to determine a price in a random manner every time without providing the price determining table 12e.

In this regard, although the game is configured so that plural kinds of goods are bought and then resold in the embodiment described above, it may be configured so that one kind of goods is bought and then resold. In this case, the video game processing apparatus 100 may carry out a process to receive selection of any of the goods selling characters SC1 to SC3 to acquire stock goods, and to receive selection of any of the goods buying characters BC1 to BC4 without receiving selection of the stock goods to resell the corresponding stock goods.

As explained above, in one embodiment described above, the video game processing apparatus 100 for controlling progress of a video game used to simulate resale business of goods on a display screen of an image display apparatus (for example, display section 14) is constructed so as to: cause the image display apparatus to distinguishably display dealer characters (goods selling characters SC1 to SC3) and buyer characters (goods buying characters BC1 to BC4) on the display screen of the image display apparatus, each of the dealer characters carrying out sale of goods, each of the buyer characters carrying out buying of goods; execute a buying process (Steps S105 to S108) of goods from the selected dealer character (goods selling character SC1) when a player selects any from the dealer characters; and execute a resale process (Steps S111 to S113) of goods to the selected buyer character (goods buying character BC1) when the player selects any from the buyer characters. Thus, it is possible to provide the goods reselling simulation game that is caused to proceed by means of direct and simple operations of even a user having no or little expert knowledge, and to provide a simulation game acceptable for a wide range of users.

Namely, it is possible to provide the goods reselling simulation game having a simple configuration in which the buying process according to selection of any of the goods selling characters SC1 to SC3 and the resale process according to selection of any of the goods buying characters BC1 to BC4 are carried out. The player can enjoy the game by means of simple operations to buy goods on the basis of selection of a character intended to sell the goods and to resell stock goods on the basis of selection of a character intended to buy the stock goods. Therefore, this makes it possible to provide the simulation game acceptable for a wide range of users.

Further, in the embodiment described above, the video game processing apparatus 100 is constructed so as to: include the memory 12 for storing the goods bought from the selected dealer character (any of the goods selling characters SC1 to SC3) as stock goods; cause the image display apparatus to display the stock goods stored in the memory 12 in the stock goods display region 200 on the display screen; execute a process to store the goods associated with the dealer character selected by the player in the memory 12 as the stock goods in the buying process; and execute a process to delete the resold goods from the stock goods stored in the memory 12 in the resale process in the case where the buyer character selected by the player matches with the stock goods rightly (that is, right matching is carried out). Thus, it is possible to display the stock goods that can be resold on the display screen visibly for the player, and this makes it possible for the player to carry out the game more easily.

Further, in the embodiment described above, the video game processing apparatus 100 is constructed so as to: receive selection of a dealer character by means of operations of the player as a request to buy goods from the dealer character; execute the buying process of the goods from the selected dealer character; and reject the request to buy the goods by selection of the dealer character in the case where the number of stock goods stored in the memory 12 reaches a predetermined upper limit even when any of the dealer characters (goods selling character SC1 to SC3) is selected by means of operations of the player. Thus, it is possible to provide the upper limit of goods that the player can hold as stock, and this makes it possible to prevent the game from being complicated.

Further, in the embodiment described above, the video game processing apparatus 100 is constructed so that arbitrary goods for the purpose of buying are associated with each of the buyer characters (goods buying characters BC1 to BC4), and so as to: determine that right matching is carried out in the case where stock goods selected from the goods displayed in the stock goods display region 200 by means of operations of the player coincides with goods associated with the buyer character (goods buying character BC1) selected by the player after selection of arbitrary stock goods. Thus, it is possible to provide the goods reselling simulation game having a simple configuration in which the buying process according to selection of any of the goods selling characters SC1 to SC3 and the resale process according to selection of any of resale target goods and any of the goods buying characters BC1 to BC4 are carried out. Therefore, it is possible to provide the goods reselling simulation game that is caused to proceed by means of direct and simple operations of even a user having no or little expert knowledge, and to provide a simulation game acceptable for a wide range of users. The player can enjoy the game by means of simple operations to buy goods on the basis of selection of a character intended to sell the goods and to resell stock goods on the basis of selection of goods and selection of a character intended to buy the goods. Therefore, this makes it possible to provide the simulation game acceptable for a wide range of users.

Further, in the embodiment described above, the video game processing apparatus 100 is constructed so as to: apply a higher point to the player as a difference generated by the resale becomes larger, giving and receiving of an amount of money associated with goods as a target of buying and reselling occurring in the buying process and the resale process; receive goods selected by the player from the goods displayed in the stock goods display region 200 as repair target goods; and execute a repair process to update a goods point indicated by goods data of the repair target goods thus received to a value after repair. Thus, it is possible to execute a process to simulate a recycle shop, in which stock goods are repaired to heighten a commodity value thereof, by means of simple processes according to simple operations by the player.

Further, in the embodiment described above, the video game processing apparatus 100 is constructed so that goods intended for sale of plural kinds of goods are associated with each of the dealer characters (goods selling character SC1 to SC3) and goods intended for buying of plural kinds of goods are associated with each of the buyer characters (goods buying character BC1 to BC4), and so as to cause the image display apparatus to display a goods icon indicating goods intended for sale by a dealer character (goods selling character SC1 to SC3) in the vicinity of the dealer character, and to display a goods icon indicating goods intended for buying by a buyer character (goods buying character BC1 to BC4) in the vicinity of the buyer character. Thus, it is possible to give the player recognition of sale target goods and buying target goods of the respective characters easily.

Further, in the embodiment described above, the video game processing apparatus 100 is constructed so as to: cause each of the dealer characters (goods selling character SC1 to SC3) and buyer characters (goods buying character BC1 to BC4) to appear on the display screen in accordance with a predetermined appearance rule (see FIG. 6); measure staying time of each of the dealer characters and buyer characters; cause each of the dealer characters and buyer characters to leave from the display screen when predetermined stayable time elapses; and cause the image display apparatus to display sale remaining time of the predetermined stayable time in the vicinity of each of the buyer characters on the display screen and to display buying remaining time of the predetermined stayable time in the vicinity of each of the dealer characters. Thus, it is possible to give the player recognition of remaining staying time of each character as reference of selection of the order of buying and selling, and this makes it possible to heighten a game element.

Figure 14:
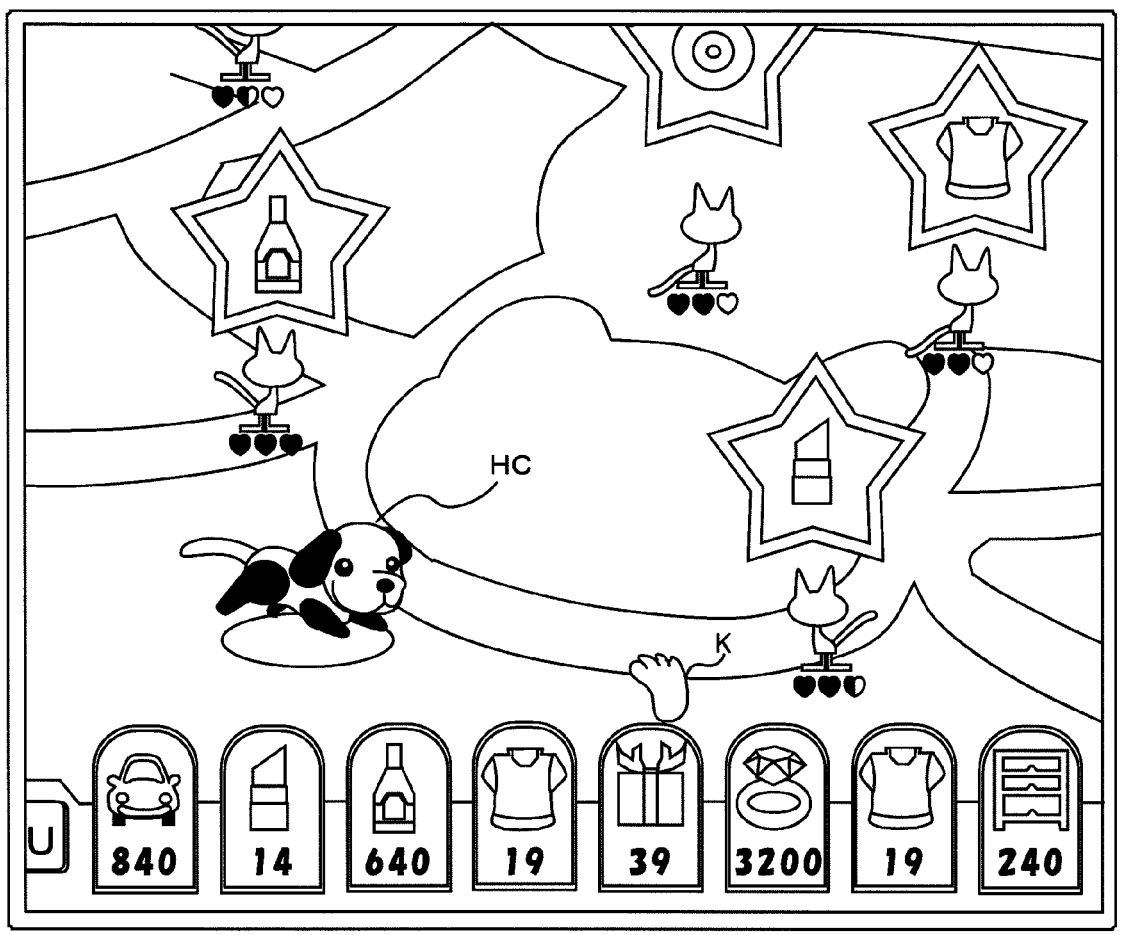
FIG. 14 is an explanatory drawing showing an example of the display screen.

In this regard, although it has never been mentioned in particular in the embodiment described above, an obstacle character HC may be displayed on the display screen in accordance with a difficulty level of the game, for example, as shown in FIG. 14. Namely, an obstacle in progress of the game may be made so that a resale action becomes impossible while the obstacle character HC exists on the display screen by disabling operations by the player regarding resale. Further, in the case where the game is configured so that a resale action cannot be carried out while an obstacle character HC exists on the display screen, various icons may be deleted or shapes of the icons may be changed in order to readily show the player that the resale action cannot be carried out. Moreover, in order to motivate the player to remove the obstacle character HC early, a privilege such as addition of a bonus score to the overall point may be applied to the player when the player succeeds in removal of the obstacle character HC.

Figure 15:
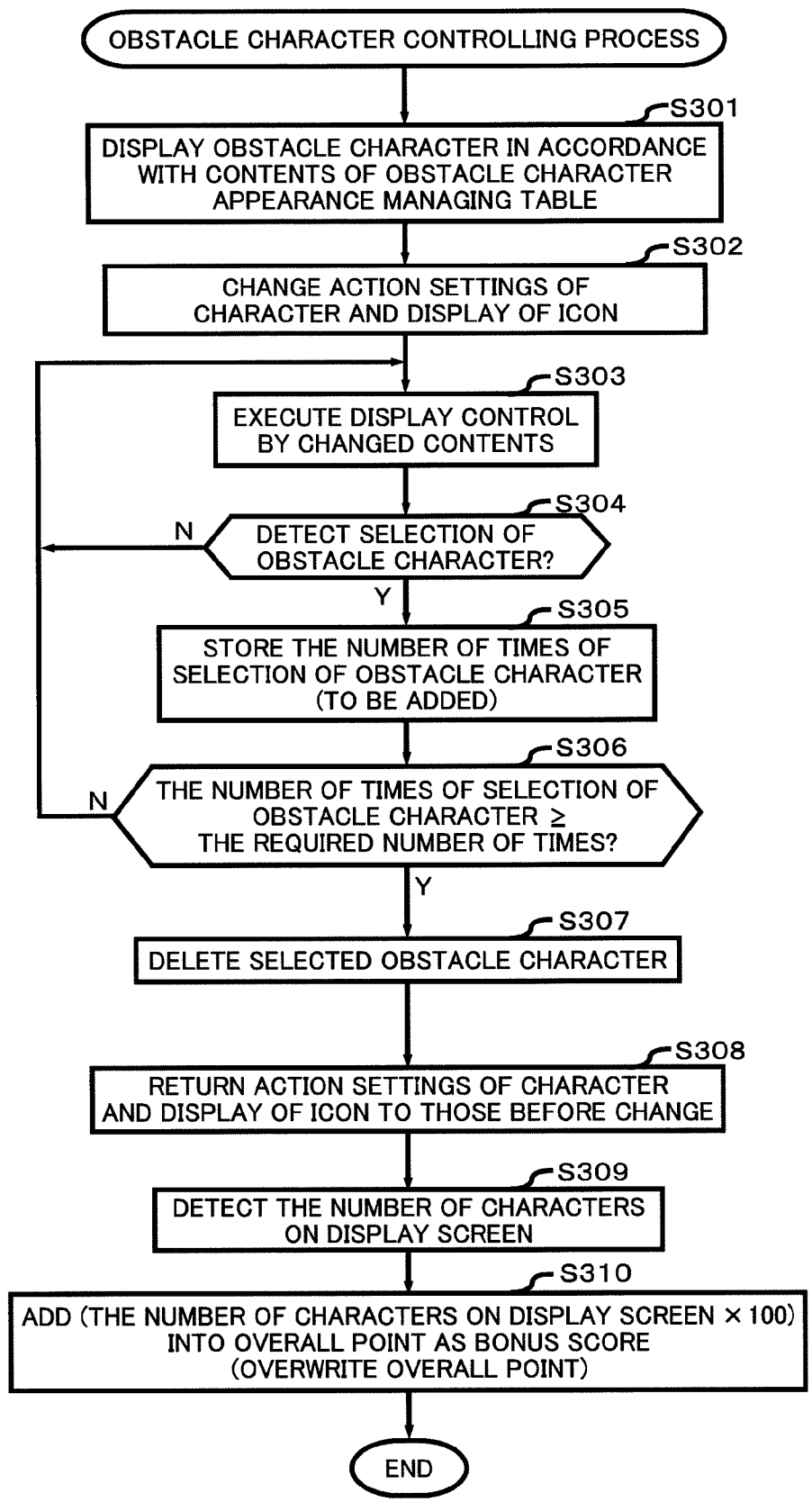
FIG. 15 is a flowchart showing an example of an obstacle character controlling process.

Hereinafter, an example of an operation of the video game processing apparatus 100 when to carry out an event by the obstacle character HC will be described. FIG. 15 is a flowchart showing an obstacle character controlling process from the time when the video game processing apparatus 100 causes the obstacle character HC to be displayed to the time when a bonus score is added into the overall point. In this regard, the control section 11 may be configured to stop a timer for measuring time of a stage when the obstacle character controlling process is in execution, or to keep the timer running.

In the obstacle character controlling process, the control section 11 determines whether or not an event by an obstacle character HC is carried out in accordance with the contents of the obstacle character appearance managing table 12f stored in the memory 12. In the case where it is determined that the event is to be carried out, the control section 11 causes the display section 14 to display the obstacle character HC on the display screen (Step S301). During progress of the game in each stage (while the game process shown in FIG. 5 is in execution), the control section 11 always refers to the obstacle character appearance managing table 12f. FIG. 16 is an explanatory drawing showing an example of the storage state of the obstacle character appearance information in the obstacle character appearance managing table 12f. As shown in FIG. 16, the obstacle character appearance information is information in which an elapsed time range from start of the game is associated with the appearance number of obstacle characters HC in the corresponding time range for every stage. In the present embodiment, the "elapsed time range" is set up on 100 seconds basis of elapsed time from time to start the game. For example, in the case where Stage 1 is selected, the control section 11 causes the display section 14 to display one obstacle character from start of the game until 100 seconds elapses.

When the obstacle character HC is displayed on the display screen, the control section 11 changes action settings of the goods selling character and goods buying character and display of icons (Step S302), and executes display control by the action settings thus changed (Step S303). Namely, the control section 11 controls the goods selling character and goods buying character displayed on the display screen so that they are evacuated from the obstacle character HC and moved toward the outside of the display screen. Further, in the case where a resale action becomes impossible during display of the obstacle character HC, in order to easily show the player that a resale action cannot be carried out, the control section 11 deletes display of a goods icon associated with each character, or executes control to change a shape or color of the icon, for example.

Next, a method of deleting an obstacle character HC will be described. In the present embodiment, an obstacle character HC displayed on the display screen can be eliminated to be deleted from the display screen by selecting the obstacle character HC by specified number of times using the cursor K (for example, clicking of a mouse). The control section 11 detects selection of the obstacle character HC by means of operations of the player via the player operation receiving section 16 (Step S304). When selection of the obstacle character HC is detected ("YES" at Step S304), the control section 11 stores the number of times of selection of an obstacle character in the memory 12, for example (Step S305).

The control section 11 then determines whether the number of times to select the obstacle character by means of operations of the player reaches the number of times required to eliminate the obstacle character HC (for example, ten times or twenty times) or not (Step S306). Here, the required number of times is defined in advance and stored in the memory 12. Display control of the character is carried out by the action settings that have been changed at Step S302 until it reaches the required number of times.

In the case where the number of times to select the obstacle character reaches the required number of times ("YES" at Step S306), the control section 11 deletes the obstacle character HC from the display screen (Step S307); sets the action settings of the character and the display of the icon that have been changed at Step S302 to the state before change; and carries out display control by the normal action settings before change (Step S308).

Moreover, the control section 11 detects the number of characters displayed on the display screen (Step S309); adds a value obtained by multiplying a predetermined number (for example, 100) by the number of characters indicated by the detection result to the overall point of the player as a bonus point; and overwrites data on the overall point (Step S310).

In the present embodiment, although a method of eliminating the obstacle character HC is defined as described above, for example, the player is caused to adopt another method such as roll of a specific button or consumption of the overall point.

In this regard, although the bonus determining condition at Steps S309 and S310 is based on the number of characters existing on the display screen after deletion of the obstacle character HC in the present embodiment, other conditions may be adopted. For example, it may be configured so that a bonus point determining table is provided in the memory 12 and a bonus point is determined in accordance with time elapsed until the obstacle character HC is deleted.

Figure 17:
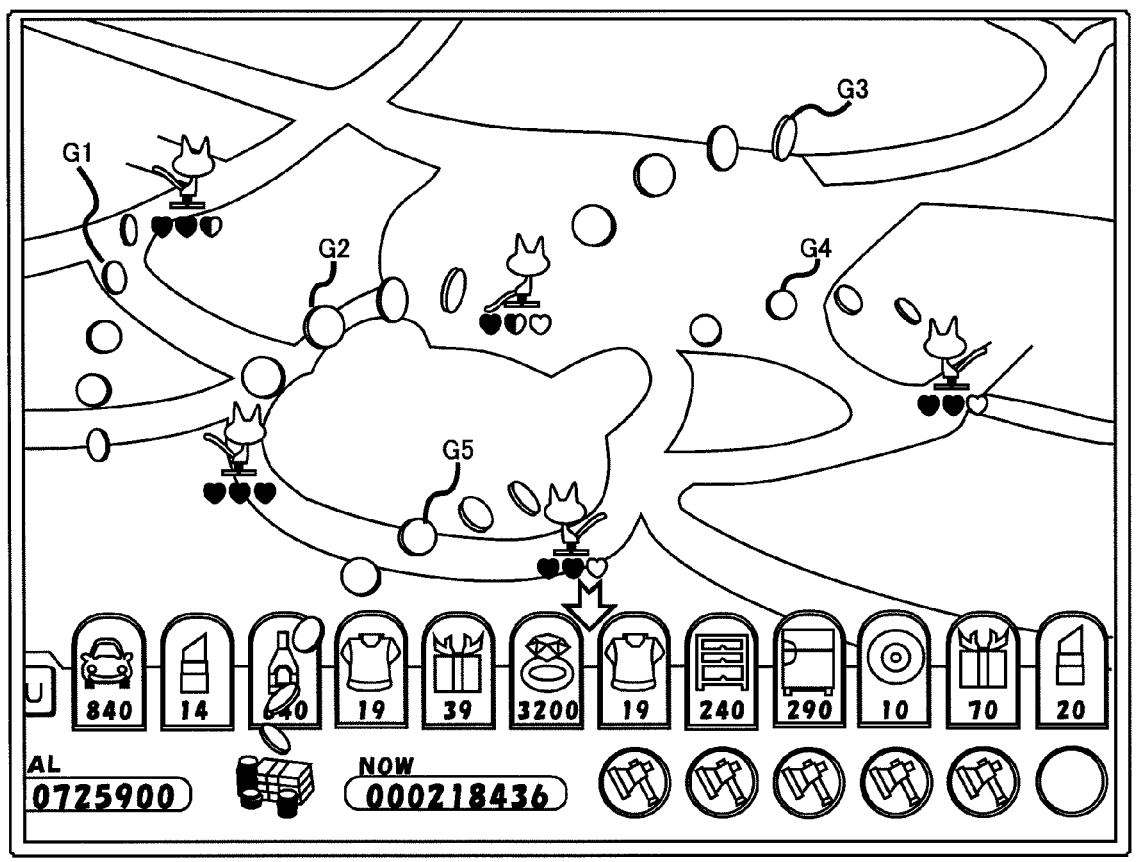
FIG. 17 is an explanatory drawing showing an example of the display screen.

Further, the control section 11 may execute bonus applying performance for informing the player of application of the bonus point on the game screen as shown in FIG. 17, for example. FIG. 17 shows a state where a group of coins G1 to G5 corresponding to the number of remaining characters, which has been detected at Step S309, gushes out from the vicinity of each character on the display screen as the bonus applying performance.

As described above, the video game processing apparatus 100 is constructed so as to adjust appearance of each of the buyer characters and dealer characters so that matching required when to execute the resale process becomes more difficult as a level of the player is increased.

In this case, the video game processing apparatus 100 is constructed so as to: receive selection of only the goods selling characters and goods buying characters displayed on the display screen of the image display apparatus (display section 14); execute control to gradually move the goods selling characters and goods buying characters toward the outside of the display screen of the image display apparatus so as to avoid an obstacle character HC, which becomes an obstacle in progress of the video game, displayed on the display screen while the obstacle character HC is displayed on the display screen; receive an eliminating request of the obstacle character HC by means of operations of the player after the obstacle character HC is displayed on the display screen; and eliminate and delete the obstacle character HC from the display screen in response to reception of the eliminating request. Thus, it is possible to carry out an event that an obstacle character is caused to appear on the display screen to interfere with resale work, and this makes it possible to increase variation in the contents of the game.

In this regard, although the video game processing apparatus 100 is constructed so as to execute various processes such as the above-mentioned game process on the basis of the game program read out from the game cartridge 20 in the embodiment described above, the video game processing apparatus 100 may acquire the game program from a game server via a communication network such as the Internet. Further, the video game processing apparatus 100 may function as a game server to deliver the game program to game terminals via a communication network.

In this regard, in the embodiment described above, the video game processing apparatus 100 carries out the various processes described above in accordance with a control program (video game processing program) stored in a storage device (memory 12) equipped by the video game processing apparatus 100.

According to the present invention, it is useful to provide a goods reselling simulation game that is caused to proceed by means of direct and simple operations of even a user having no or little expert knowledge, and to provide a simulation game acceptable for a wide range of users.

What is claimed is:

1. A video game processing apparatus configured to receive, from a controller, an operation signal responsive to a player operation of the controller and thereby control a progress of a video game, the video game being used to simulate a resale business of goods on a display screen of an image display apparatus, the video game processing apparatus comprising:
    a character display controller that causes the image display apparatus to distinguishably display dealer characters and buyer characters on the display screen of the image display apparatus;
    a goods buying processor that, when a selected dealer character of the dealer characters is selected by the player operation of the controller, executes a buying process of bought goods from the selected dealer character;
    a stock goods memory that stores the bought goods bought from the selected dealer character as stock goods;
    a stock goods display controller that causes the image display apparatus to display the stock goods stored in the stock goods memory in a stock goods display region on the display screen; and
    a goods resale processor that, when a selected buyer character of the buyer characters is selected by the player operation of the controller, executes a resale process of resold goods to the selected buyer character,
    wherein the goods buying processor executes a process to store the bought goods associated with the selected dealer character selected by the player operation of the controller in the stock goods memory as the stock goods, and
    wherein, when the resold goods resold to the selected buyer character, selected by the player operation of the controller, matches with the stock goods, the goods resale processor executes a process to delete the resold goods from the stock goods stored in the stock goods memory.

2. The video game processing apparatus according to claim 1, further comprising:
    a goods buying request receiver that receives a selection of the selected dealer character by the player operation of the controller as a request to buy the bought goods from the selected dealer character,
    wherein the goods buying processor executes the buying process of the bought goods from the selected dealer character, and
    wherein, when the number of stock goods stored in the stock goods memory reaches a predetermined upper limit, even when any of the dealer characters is selected by the player operation of the controller, the goods buying request receiver rejects the request to buy the bought goods by the selection of the selected dealer character.

3. The video game processing apparatus according to claim 1,
    wherein arbitrary goods for buying are associated with each of the buyer characters, and
    wherein, when selected stock goods selected from the stock goods displayed in the stock goods display region by the player operation of the controller coincide with the arbitrary goods associated with the selected buyer character selected by the player operation of the controller after selection of the selected stock goods, it is determined that matching is carried out.

4. The video game processing apparatus according to claim 1, further comprising:
    a point applier that applies a point and gives and receives an amount of money associated with the bought goods of the buying process and the resold goods of the resale process, the point applier applying a higher point as a difference generated by the resale becomes larger;
    a repair target goods receiver that receives repair target goods selected by the player operation of the controller from the stock goods displayed in the stock goods display region; and
    a repair processor that executes a repair process to update a goods point indicated by goods data of the repair target goods received by the repair target goods receiver to a value after repair.

5. The video game processing apparatus according to claim 1, wherein a character appearance controller adjusts an appearance of each of the buyer characters and each of the dealer characters so that a match required when the goods resale processor executes the resale process becomes more difficult as a level of the video game increases.

6. A non-transitory computer program product executable by a computer that is configured to receive, from a controller, an operation signal responsive to a player operation of the controller and thereby control a progress of a video game, the video game being used to simulate a resale business of goods on a display screen of an image display apparatus, the computer program product comprising:
- causing the image display apparatus to distinguishably display dealer characters and buyer characters on the display screen of the image display apparatus;
- executing a buying process of bought goods from the selected dealer character when a selected dealer character of the dealer characters is selected by the player operation of the controller;
- storing the bought goods bought from the selected dealer character as stock goods in a stock goods memory;
- causing the image display apparatus to display the stock goods stored in the stock goods memory in a stock goods display region on the display screen; and
- executing a resale process of resold goods to the selected buyer character when a selected buyer character of the buyer characters is selected by the player operation of the controller,
- wherein the buying process stores the bought goods associated with the selected dealer character selected by the player operation of the controller in the stock goods memory as the stock goods, and
- wherein, when the resold goods resold to the selected buyer character, selected by the player operation of the controller, matches with the stock goods, the resale process deletes the resold goods from the stock goods stored in the stock goods memory.

7. The non-transitory computer program product according to claim 6, further comprising:
- receiving a selection of the selected dealer character by the player operation of the controller as a request to buy the bought goods from the selected dealer character,
- wherein the buying process buys the bought goods from the selected dealer character in response to receiving the request, and
- wherein, when the number of stock goods stored in the stock goods memory reaches a predetermined upper limit, even when any of the dealer characters is selected by the player operation of the controller, the request to buy the bought goods of the selected dealer character is rejected.

8. The non-transitory computer program product according to claim 6,
- wherein arbitrary goods for buying are associated with each of the buyer characters, and
- wherein, when selected stock goods selected from the stock goods displayed in the stock goods display region by the player operation of the controller coincide with the arbitrary goods associated with the selected buyer character selected by the player operation of the controller after selection of the selected stock goods, it is determined that matching is carried out.

9. The non-transitory computer program product according to claim 6, further comprising:
- applying a point and giving and receiving an amount of money associated with the bought goods of the buying process and the resold goods of the resale process, a higher point being applied as a difference generated by the resale becomes larger;
- receiving repair target goods selected by the player operation of the controller from the stock goods displayed in the stock goods display region; and
- executing a repair process to update a goods point indicated by goods data of the repair target goods to a value after repair.

10. The non-transitory computer program product according to claim 6, wherein an appearance of each of the buyer characters and each of the dealer characters is adjusted so that a match required when the resale process is executed becomes more difficult as a level of the video game increases.

* * * * *